United States Patent
Billings

[11] Patent Number: 5,897,785
[45] Date of Patent: Apr. 27, 1999

[54] PROCESS FOR TREATING ANIMAL WASTE

[76] Inventor: Richard Billings, 311 W. 7th St., Chelsea, Okla. 74016

[21] Appl. No.: 08/863,776

[22] Filed: May 27, 1997

[51] Int. Cl.[6] .................. C02F 1/54; C02F 1/32
[52] U.S. Cl. .......... 210/734; 210/748; 210/760; 210/770; 422/24
[58] Field of Search .................. 210/748, 760, 210/734, 770; 422/24

[56] References Cited

U.S. PATENT DOCUMENTS

| | | | |
|---|---|---|---|
| 3,767,918 | 10/1973 | Graybeal . | |
| 4,208,282 | 6/1980 | Becker | 210/748 |
| 4,752,401 | 6/1988 | Bodenstein | 210/746 |
| 4,957,606 | 9/1990 | Juvan | 210/748 |
| 5,207,921 | 5/1993 | Vincent | 210/748 |
| 5,472,472 | 12/1995 | Northrop | 210/602 |
| 5,698,110 | 12/1997 | Wyatt | 210/751 |

Primary Examiner—Jay H. Woo
Assistant Examiner—Betsey J. Morrison
Attorney, Agent, or Firm—Molly D. McKay

[57] ABSTRACT

A process for treating animal waste consisting of diluting the waste with water, irradiating the waste with UV radiation to break DNA coding in microorganisms present within the waste and to form ozone which oxidizes the waste, polymerizing the solids in the waste, and separating the polymerized solids from the remaining liquid portion of the waste.

20 Claims, 2 Drawing Sheets

PROCESS FOR TREATING ANIMAL WASTE

BACKGROUND OF THE INVENTION

1. Field of the Invention

The present invention relates to an economical process for treating animal waste. Specifically, the present invention is a process for eliminating the odor, the moisture and the bacterial, viral, fungal and algal components of animal waste so the liquids are recyclable in the process and the solids, which are rich in nutrients, are safe for use or for marketing as a fertilizer.

2. Description of the Related Art

For years, poultry, hog, and cattle growers have been faced with disposing of the waste produced by their animals. Back in the 1950s and 1960s, many poultry growers were farmers who ran only one or two relatively small poultry houses and who also owned land where the waste from their poultry houses could be spread as fertilizer for their fields. The advent of intensive poultry growing operations has created a situation where thousands of birds are housed in a single poultry house, where birds are grown to market size more quickly, and where poultry houses do not remain empty for significant periods of time between different batches of poultry. Under these conditions, poultry growers have been faced with a waste disposal dilemma. Poultry growers must dispose of increasing larger volumes of waste at more frequent intervals onto smaller areas of farm land. Also with the increase in population in traditional poultry growing areas, such as for example southwest Missouri and northeast Arkansas, health concerns and esthetic concerns have made traditional land disposal of untreated poultry waste environmentally, medically and socially unacceptable practices.

Anyone who has a home near an area used for disposing untreated poultry waste can attest to the foul odor and the increase of disease carrying flies in the vicinity. The property value of homes can be adversely affected since potential buyers find the environment unacceptable.

Drinking water can also be contaminated by field disposal of untreated animal waste. Animal waste contains an impressive list of pathogens, including among others, bacteria and virus which produce tetanus, diphtheria, tuberculosis, hepatitis, influenza, polio, food poisoning, typhoid, cholera and streptococcus and staphylococcus infections. In many rural areas residents obtain their drinking water from springs or wells, as is the case in many of the traditional poultry growing areas. Poultry waste disposal can seriously endanger the health of area residents who may consume contaminated water. The health of farm animals may be detrimentally affected as well. Animals often graze in the fields where poultry waste is deposited may drink from ponds or creeks which have become contaminated by runoff water originating from fields used for poultry waste disposal.

An increasing number of poultry producing areas, are becoming interested in attracting tourism. For tourism to thrive in poultry producing areas, it is critical that the problem of poultry waste disposal be resolved.

Research is ongoing on a variety of methods of treating animal wastes. For example, some are mixing the poultry waste with cementious materials, ground waste paper, or limestone, in an attempt to reduce the odor, and to make the waste more environmentally acceptable. These various methods tend to increase the total volume of waste rather than decrease it. These methods do not destroy the bacteria, fungi and viri which are the main source of odor. Biocides and microbicides cannot be used because they would prevent the reinoculation of good bacteria and prevent the substance from composting.

The present invention is a process which decreases the volume of waste by removing the water, which averages 75% of the total volume. It treats the waste so the organisms contained therein will not be able to reproduce. This is done by rearranging the DNA coding (deoxyribonucleic acid, the genetic substance of all living cells and many viruses) using the process of radiation. These microbes will die naturally within a matter of hours after treatment. In addition, this invention oxidizes the waste by ozonation to destroy the odor. Thus, the waste which results from this process is reduced in volume and is sterile and odorless, but it retains all of its nutrients and can be further degraded. This treatment process is carried out immediately after the waste leaves the animal housing and can be completed within minutes from the time the waste is deposited by the animal. When used as fertilizer, it will be reinoculated with good bacteria which are native to the soil to which the waste is applied. The liquid portion of the waste is also made odorless and sterile by the process. It can be recycled within the system to reduce the amount of fresh water needed to be introduced into the system.

SUMMARY OF THE INVENTION

The present invention is a process for treating animal waste, such as poultry, swine, or cattle waste. In the poultry industry or swine industry, the waste is collected by some effective means, such as scrapers. It is removed from the animal housing and deposited onto a sloping beech or ramp located at one end of the house. The waste is diluted with water on the beach. The water employed is either fresh water or recycled water from the process. The diluted waste is then pumped via a waste pump to a dilution tank where the waste is further mixed and diluted with fresh water. The waste is diluted to a ratio of approximately one (1) part waste to ten (10) parts water in the dilution tank. A slurry pump moves the waste to the topside of an inclined rack. The inclined rack slopes downward at an approximate fifteen (15) degree angle from the topside to an opposite downside. The inclined rack contains a series of partitions extending from side to side. Fluids entering the rack at the top, will travel from left to right, from the topside to the opposite downside of the inclined rack. Each partition is open on alternating opposite ends, thus, waste slurry entering the inclined rack on the topside will travel back and forth between the first side and second side of the inclined rack, dropping down one channel each pass. By doing this, it will be exposed to the radiation, traveling more than seventy two (72) feet inside the maze. The degree of tilt is adjustable, and by this means, the exposure time is adjustable.

Two types of radiation tubes are provided in alternating arrangement above the inclined rack. The first tube type produces ultraviolet radiation with a wavelength of approximately 253.7 nanometers (nm). The second type tube produces ultraviolet radiation in the range of approximately 218–220 nm wavelength, which produces ozone. These tubes alternate, so the waste is both disinfected and ozonated as the waste travels down the inclined plane from channel to channel. Each radiation tube is secured so it is equidistant from the diluted waste throughout its journey through the inclined maze. The tilted maze is adjustable, so the time of exposure may be adjusted by the tilt. The 253.7 nm radiation exposure breaks and rearranges the DNA coding contained within organisms present in the waste. This causes the organisms to be unable to reproduce. The second type tube produces radiation in the 218–220 nm range, which converts oxygen ($O^2$) to ozone ($O^3$). The ozone oxidizes the waste, thus stopping the odor. All radiation produced by the tubes is contained in a radiation safe housing that will prevent its escape.

After being irradiated in the inclined rack, the waste exits on the downside and is pumped via a second slurry pump to a polymer mixing tank. High charge, cationic polymers are stored in polymer stock tanks and are pumped into the mixing tank via a metering pump. The polymers are mixed with the waste in the polymer mix tank and react with the solid portion of the waste to form a polymerized solid. The waste is then transferred to a separation booth where the bulk of the liquid is removed from the waste by gravity. The sterile liquid is removed and stored in a collection tank. The polymerized solids are transferred to a belt press where the remaining liquid is expressed. The semi-dry polymerized solids are transferred to a dry waste tote. The sterile water in the water collection tank may be returned to the sloping beach at the beginning of the process, via a pipeline, to be used again. Or, alternately, this water may be transferred or transported to a field for irrigation or fertilization. The final dry product contained within the dry waste tote may be used immediately as fertilizer in a field, or may be further dried and packaged for retail sale as a fertilizer.

DETAILED DESCRIPTION OF THE PREFERRED EMBODIMENT

Figure 1:
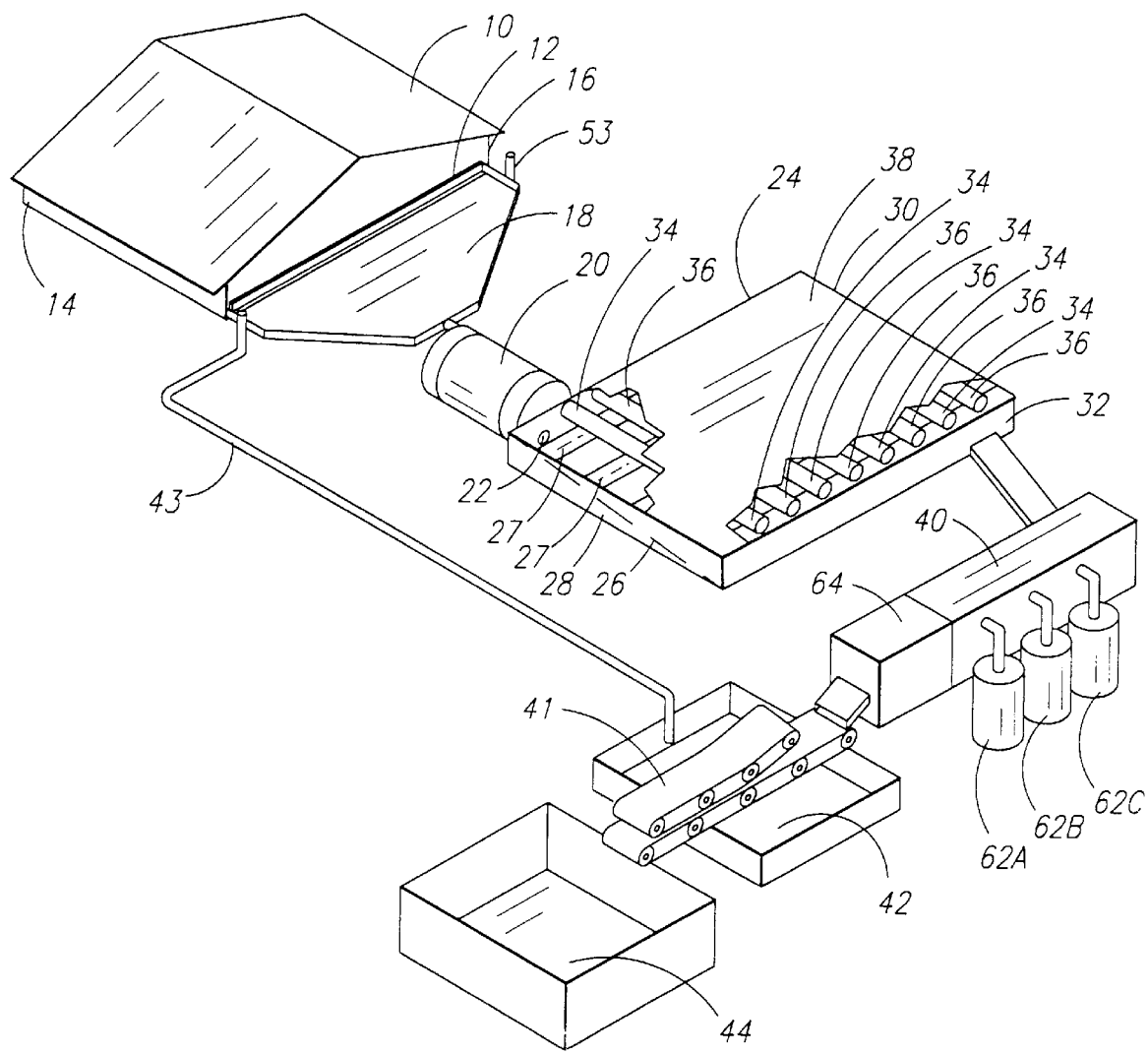
FIG. 1 is a diagram showing equipment used in this process for treating animal waste.
Figure 2:
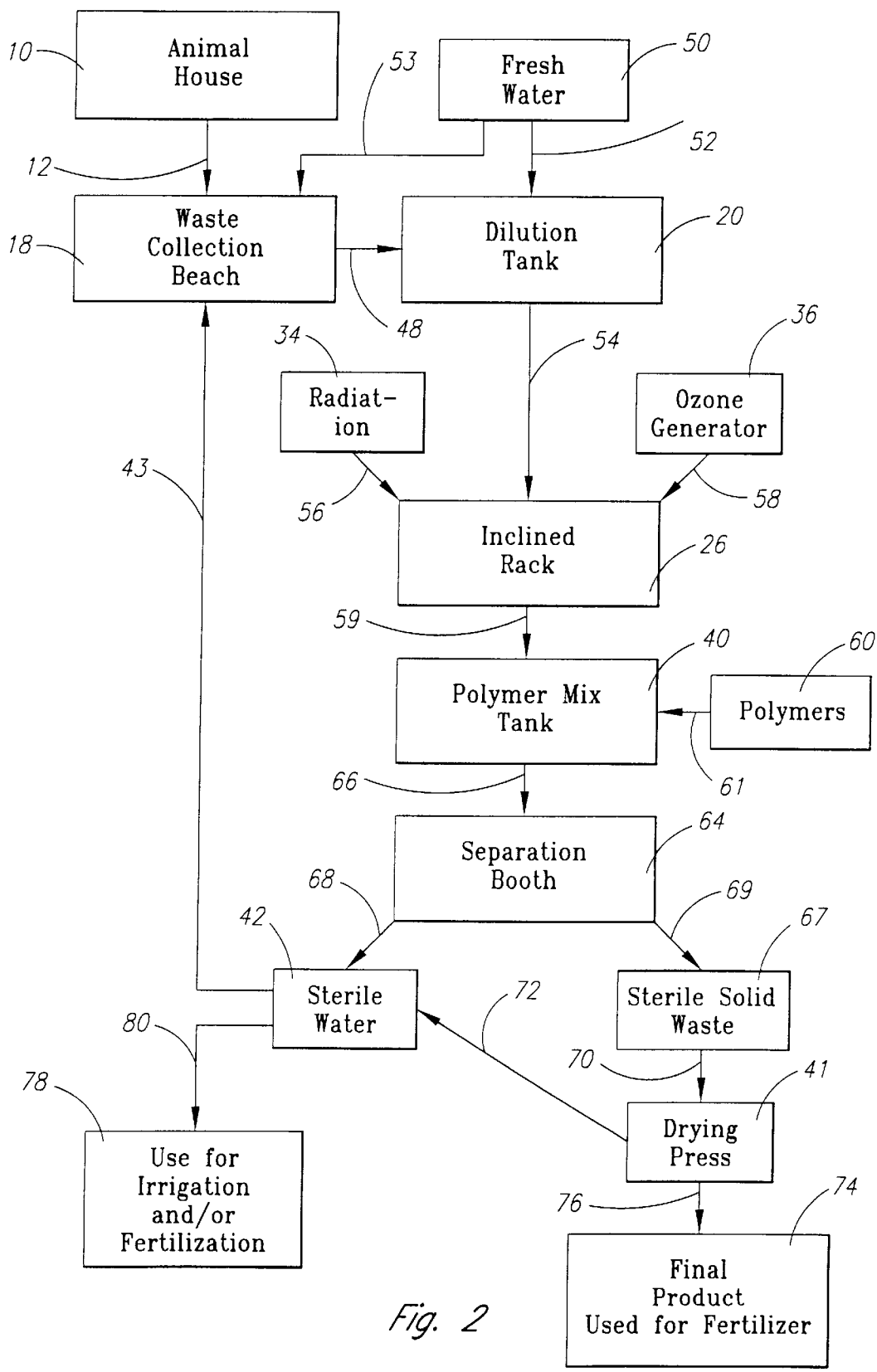
FIG. 2 is a flow chart showing the steps involved in this process for treating animal waste.

Referring to FIG. 1, there is illustrated typical equipment required to practice the present invention. FIG. 2 is a block diagram illustrating the steps involved in practicing this process for treating animal waste.

Referring now to FIG. 1, the equipment will first be described. An animal house 10 is provided with a scraper 12 which travels along the floor of the house 10, traveling from one end 14 of the house 10 to the oppose second end 16 of the animal house. The scraper 12 moves slowly along the floor of the house 10, pushing in front of it all manner of waste, including, but not limited to animal excrement. This waste, rich in organic matter, nitrogen, and phosphorus, is unpleasantly odiferous, and contains an assortment of bacteria, fungi, viri, and algae, including many pathogenic varieties.

The waste is pushed by the scraper 12 to the second end 16 of the house 10 where a sloping beach 18 is provided external to the animal house 10. Water is constantly spraying on the sloping beach 18, causing the animal waste to be diluted and flushed down the sloping beach 18 to a dilution tank 20. If needed, the animal waste is further mixed with water to form a thin waste slurry. The waste slurry is then pumped to an entrance opening 22 on an topside 24 of an inclined rack 26. The inclined rack 26 is provided with a series of horizontal partitions 27 which force the waste slurry to travel back and forth from side 28 to opposite side 30 of the inclined rack 26. The waste slurry flows via gravity from the entrance opening 22 to an exit provided in a downside 32 of the inclined rack 26. The inclined rack 26 is provided with a plurality of UV radiation tubes 34 and 36 which are located just above the inclined rack 26. Two types of radiation tubes are utilized. The first type 34 produces a germicidal ray that rearranges and destroys the DNA coding of the bacteria, viri, fungi, and algae. The second type of radiation, produces ozone, which stops the odor. The first type 34 produces radiation of approximately 253.7 nm, and the second tube type 36 produces radiation of approximately 218–220 nm. The UV producing radiation tubes 34 and 36 are provided in alternating arrangement so that each tube is secured by one of its ends to the topside 24 of the inclined rack 26 and is secured on its opposite end to the downside 32 of the inclined rack 26, as illustrated in FIG. 1.

The inclined rack 26 is provided with a covered protective container 38 so all of the radiation produced by the tubes 34 and 36 remains within the container 38. This increases the radiation absorbed by the waste slurry and prevents harmful radiation rays from escaping the container 38.

The waste slurry then exits the inclined rack 26 at downside 32 and enters a polymer mix tank 40. The waste slurry is mixed in the polymer mix tank 40 with high charge cationic polymers which react with solids in the waste slurry and cause the solids to be separated from the remaining liquid portion. The separated waste slurry is then fed out of the polymer mix tank 40 to a separation booth 64 where the majority of the liquid portion is removed from the waste slurry. The liquid portion which is removed in the separation booth 64 flows to a water collection tank 42, and the partially dry waste slurry is conveyed out of the separation booth 64 onto a belt press 41 where the remaining liquid portion is forced out of the polymerized solid portion.

The final liquid portion is collected in the water collection tank 42, and may be returned via pipeline 43, to the sloping beach 18 where it is recycled as process water for diluting more animal waste. Alternately, it can be used for irrigation or fertilization of fields. The polymerized solid portion then travels to a dry waste tote 44 where the solids may be transported immediately, before drying, to fields for fertilizer. Alternately, it may be further air dried and packaged for retail sale as fertilizer.

Referring now to FIG. 2, the steps of this process will be described in more detail. The first block 10 entitled "Animal House" indicates the source of the animal waste which is to be treated in the present process. The animal waste is gathered, either via a scraper 12, as indicated by Arrow 12 in FIG. 2, or by other suitable means if the animal house 10 is not provided with a scraper 12.

Scrapers 12 are generally provided only in poultry houses where the birds are housed in wire perches above the floor. In poultry houses where the birds actually stand on the floor, the poultry waste will be gathered by other effective means. The means of removing the animal waste from the house is not a part of this invention. If a scraper 12 is employed, the animal waste is gradually pushed onto the sloping beach 18 where it is flushed down the beach 18 with sterile water provided via the pipeline 43 from the water collection tank 42. The sterile water mixes with the animal waste and the mixture is transferred, usually via waste pump 48 to the dilution tank 20. The waste is further mixed with fresh water 50 which is added to the dilution tank 20 via a first fresh water supply line 52.

Fresh water 50 may also be provided to the waste collection beach 18 via a second fresh water supply line 53. Addition of fresh water 50 to the beach 18 may be desirable when there is insufficient recycled sterile water available from the water collection tank 42 to adequately flush the beach 18. For example, fresh water will be utilized during initial start up of the system.

The animal waste is mixed in the dilution tank 20 with the fresh water 50 in order to dilute the waste to a ratio of approximately one (1) part animal waste to ten (10) parts of water, forming a thin waste slurry in the dilution tank 20. The thin waste slurry is then pumped via slurry pump 54, to the entrance opening 22 on the inclined rack 26. The thin waste slurry travels through the inclined radiation rack 26 where it is bombarded with UV radiation of two wavelengths supplied respectively by the first tube type 34 and the second tube type 36.

The first tube type 34 produces UV radiation of a wavelength of approximately 253.7 nm, as indicated by arrow 56 in FIG. 2. This wavelength of radiation rearranges and damages the DNA coding within living organisms contained within the waste slurry. Specifically, the DNA coding of bacteria, fungi and algae are rearranged and damaged so that these organisms are thereafter unable to reproduce. Likewise, the DNA coding contained within viri present in the waste slurry, will be rearranged and damaged by this UV radiation, rendering the virus thereafter unable to invade other organisms. The result of this bombardment of the waste slurry with 253.7 nm UV radiation 56 is to cause the waste slurry to become sterile. The offensive odor attributed to the waste slurry is caused by these organisms within the slurry as they break down the organic matter in the slurry. When organisms are genetically altered by the 253.7 nm UV radiation 56, they also lose their ability to break down the organic components in the waste slurry, thus rendering the slurry odor free. Although the waste slurry still has some living organisms in it, these organisms are not capable of reproducing and will soon die. The waste slurry will generally be considered sterile after it is treated with sufficient exposure to the 253.7 nm UV radiation 56.

In addition to the 253.7 nm UV radiation 56 which bombards the waste slurry in the inclined rack 26, the second tube type 36 produces UV radiation of a wavelength of approximately 218–220 nm, as indicated by Arrow 58 in FIG. 2. This wavelength of radiation causes ozone to be formed. The ozone reacts with the organic components in the waste slurry to oxidize these organic components. This oxidation of organic components within the waste slurry further reduces the odor of the waste slurry, rendering it almost completely odor free.

The waste slurry then is pumped via a second slurry pump 59 to the polymer mix tank 40 where high charge cationic polymers 60 are added via a polymer metering pump 61 to the waste slurry from polymer storage tanks 62A, 62B, 62C. The polymers 60 employed are very high cationic charge. They are polyacrylamide co-polymers based on the co-polymerization of acrylamide and a cationic derivative of acrylic acid. These polymers 60 are a blend of medium high molecular weight polymers and high molecular weight polymers. The percentage of medium high and high molecular weight polymers will need to be varied for different types of animal wastes, but a 28% medium high and 72% high molecular weight polymer mixture has proven effective for chicken waste in laboratory tests. These polymers, when fed at a concentration 128 ppm are sufficient to polymerize the waste slurry.

These polymer components are readily available from many U.S. polymer manufacturers, such as Calgon, Dearborn, Stockhausen, BASF, and Nalco, etc.

Once the polymers 60 have been added to the polymer mix tank 40 and mixed with the waste slurry, the polymers react in a polymerizing reaction with a solid component of the waste slurry, forming a leathery polymerized solids component which separates naturally from the remaining liquid portion of the waste slurry. The leathery polymerized component is neutral in charge and therefore does not cling to the equipment. It is odorless and completely biodegradable. Once it is placed in the sun's radiation, it will crumble and turn to dust in a matter of hours.

The polymerized component and liquid portion of the waste slurry is then passed from the polymer mix tank 40 to a separation booth 64, as shown by arrow 66 in FIG. 2. The majority of the liquid portion is separated from the polymerized component in the separation booth 64. The liquid or water portion, which is sterile, is transferred to the water collection tank 42, as shown by arrow 68 in FIG. 2. The polymerized component or sterile solid waste 67 is transferred from the separation booth 64 to a drying press or belt press 41, as shown by Arrows 69 and 70 in FIG. 2. The solid waste 67 is compressed by the drying press 41, thus forcing any remaining water out of the solid waste 67. The liquid flows to the water collection tank 42, as shown by arrow 72 in FIG. 2. The resulting final dry product 74 enters the dry waste tote 44, as shown by arrow 76, where it is held until dried further for packaging, or transported as bulk fertilizer.

The sterile water which accumulates in the water collection tank 42 may be recycled as previously described, transported via pipeline 43, or alternately, may be employed in irrigation or liquid fertilization for a field, as indicated by block 78 and Arrow 80. Arrow 80 represents the means for transporting the sterile water to the field, for example by irrigation line or via truck.

Although the process has been described in association with poultry waste, the process is not limited to poultry waste, but may be employed with any type of animal waste or other biodegradable organic waste.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed:

1. A process for treating animal waste comprising the following Steps:

a. diluting the animal waste with water to form a thin waste slurry, b. exposing the waste slurry to adequate UV radiation to break the DNA coding in the bacterial, fungal, viral and algal constituents of the waste and to ozonate the waste, c. mixing very high charge cationic polymers with the waste slurry to cause solids to react with the polymers and separate from the water, and d. removing the water of the waste slurry from the solids of the waste slurry.

2. A process according to claim 1 further comprising the following step which occurs after Step "d":

e. drying the solids.

3. A process according to claim 2 further comprising the following step:

f. utilizing the solids for fertilizer.

4. A process according to claim 1 wherein Step "b" is accomplished by alternately exposing the animal waste slurry to a wavelength of UV radiation of approximately 253.7 nm to destroy the DNA coding and to a wavelength of UV radiation of approximately 218–220 nm to produce ozone which oxidizes the waste slurry.

5. A process according to claim 1 wherein the water removed in Step "d" is recycled as a portion of the water needed in Step "a" to dilute the animal waste to form a slurry.

6. A process according to claim 1 wherein the animal waste is diluted in Step "a" to a ratio of approximately one part poultry waste to ten parts water.

7. A process for sterilizing, reducing the volume of and eliminating the odor from poultry waste comprising the following steps:

a. gathering animal waste into a vat,
  b. mixing water with the waste to dilute the waste and form a thin slurry,
  c. irradiating the slurry with specific wavelengths of UV radiation to rearrange DNA coding of bacteria, fungi, viri and algae contained within the slurry and to produce ozone which oxidizes the slurry,
  d. polymerizing solids contained within the slurry to separate the solids from water contained in the slurry,
  e. separating the solids from the water, and
  f. recycling the water obtained from Step "e" as part of the water needed for diluting the animal waste in Step "a".

8. A process according to claim 7 further comprising the following step which occurs after Step "e":

g. drying the solids.

9. A process according to claim 8 further comprising the following step which occurs after Step "g":

h. using the solids as fertilizer.

10. A process according to claim 7 wherein the UV radiation employed in Step "c" is of two specific wavelengths.

11. A process according to claim 10 wherein the two specific wavelengths are approximately 253.7 nm and 218 nm.

12. A process according to claim 7 wherein Step "b" involves diluting the animal waste with water in a ratio of approximately one part waste to ten parts of water.

13. A process for treating animal waste comprising the following steps:

a. accumulating animal waste in a vat,
  b. adding water to the vat and mixing the animal waste and water to form a thin animal waste slurry,
  c. passing the thin animal waste slurry through a series of UV irradiated passages in order to rearrange the DNA coding found in the animal waste slurry and to oxidize the animal waste slurry,
  d. adding polymers to the animal waste slurry which polymerize with solids contained in the animal waste slurry,
  e. separating the animal waste slurry into a polymerized solids portion and a water portion,
  f. recycling the water portion from Step "e" as feed water to Step "b".

14. A process according to claim 13 further comprising the following step which occurs after Step "e":

g. drying the polymerized solids portion.

15. A process according to claim 14 further comprising the following step which occurs after Step "g":

h. using the polymerized solids as fertilizer.

16. A process according to claim 13 wherein the water added in Step "b" is in a ratio of approximately ten parts water to one part of animal waste.

17. A process according to claim 13 wherein the depth of the animal waste slurry is maintained at a maximum of 6 mm in Step "c" in order that the UV radiation may penetrate the slurry.

18. A process according to claim 13 wherein the UV irradiated passages are provided with two specific wavelengths of UV radiation.

19. A process according to claim 18 wherein the two specific wavelengths of UV radiation are approximately 253.7 nm and 218 nm.

20. A process according to claim 13 wherein the polymers added to the waste slurry in Step "d" are comprised of polyacrylamide co-polymers.

\* \* \* \* \*